April 21, 1925.
G. H. HUSS
1,534,958
MULTIPLE PATH DEVICE
Filed Nov. 10, 1921
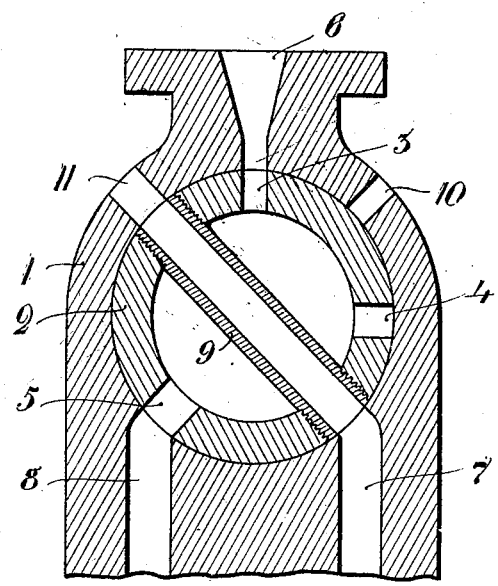
Inventor
G. H. Huss,
By Marks & Clerk
Attys.

Patented Apr. 21, 1925.

1,534,958

UNITED STATES PATENT OFFICE.

GUSTAF HJALMAR HUSS, OF STOCKHOLM, SWEDEN, ASSIGNOR TO BERGSUNDS MEKANISKA VERKSTADS AKTIEBOLAG, OF STOCKHOLM, SWEDEN.

MULTIPLE-PATH DEVICE.

Application filed November 10, 1921. Serial No. 514,384.

*To all whom it may concern:*

Be it known that I, GUSTAF HJALMAR HUSS, engineer, a subject of the King of Sweden, residing at Stockholm, Sweden, have invented certain new and useful Improvements in Multiple - Path Devices, of which the following is a specification.

In the multiple-path devices, generally so called multiple-path cocks heretofore known, a fluid may be conducted for instance from a source of supply to one or more of a number of places, according as the apparatus is adjusted in the one or the other way.

The present invention has for its purpose to provide an apparatus which, simultaneously with the flowing therethrough of a certain fluid, facilitates the leading therethrough of a second fluid for instance from another source of supply.

The invention is principally distinguished by the adjustable member provided in the apparatus, preferably a rotatable cock, being provided, in addition to the common passages or openings, with a conduit which has no communication with the said passages or openings and which in the different positions of the cock communicates with inlet and outlet openings in the fixed part of the apparatus.

The annexed drawing shows a diagrammatic view of an embodiment of the invention.

1 is the casing of the appartus and 2 the rotatable cock mounted therein, said cock being provided with the paths or passages 3, 4 and 5 which, for the purpose of leading a fluid through the apparatus, may communicate with the channels 6, 7 and 8 respectively provided in the casing. The last mentioned paths or passages and channels are in operation when a fluid is conducted in known manner for instance from a source of supply to one or more places of consumption. In addition to the said paths and channels, the cock is provided, according to the invention, with a conduit or channel 9 leading therethrough, which conduit does not communicate with the first-mentioned paths or channels, but which is in communication with the channels 7 or 8 in the casing and with the outlet 11 or 10 respectively of the casing, when the cock is in any of its extreme positions. Thus, a liquid may be conducted through the channel 7 and the conduit 9 and out through the opening 11, simultaneously as another liquid is supplied through the inlet 6 and flows further through the passage 3 of the cock and the channel 8 registering with the opening 5.

What I claim as new and desire to secure by Letters Patent of the United States is:—

A multiple-way device having a cock adapted to be rotated within a casing, the said cock consisting of a hollow sleeve forming the inlet passage of the cock and adapted to be brought into communication with separate passages in the casing of the cock, through openings provided in the wall of the said sleeve, while the outlet passage of the cock is formed by a pipe extending preferably diametrically through the hollow of the cock, the two open ends of the said pipe being also adapted alternately to be brought into communication with separate passages in the casing of the cock when the cock is rotated.

In testimony whereof I affix my signature in presence of two witnesses.

GUSTAF HJALMAR HUSS.

Witnesses:
P. O. BUGRAKH,
INEZ NOERSON.